United States Patent
Cooper et al.

(10) Patent No.: US 9,223,643 B2
(45) Date of Patent: Dec. 29, 2015

(54) CONTENT INTERRUPTIONS

(75) Inventors: Paul R. Cooper, San Jose, CA (US); Matt Henry Van der Staay, San Jose, CA (US); Chad Michael Williams, San Mateo, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 675 days.

(21) Appl. No.: 12/717,697

(22) Filed: Mar. 4, 2010

(65) Prior Publication Data

US 2011/0219258 A1 Sep. 8, 2011

(51) Int. Cl.
*H04N 7/16* (2011.01)
*G06F 11/00* (2006.01)
*G06F 11/07* (2006.01)
*G06F 15/16* (2006.01)

(52) U.S. Cl.
CPC ............... *G06F 11/07* (2013.01); *G06F 15/16* (2013.01)

(58) Field of Classification Search
CPC ............ H04N 21/4037; H04N 21/442; H04N 21/4425; H04N 21/458; H04N 21/4622; H04N 21/6375; H04N 21/64776; G06F 11/07
USPC .................. 714/2, 48, 747; 709/231; 725/142
See application file for complete search history.

(56) References Cited

U.S. PATENT DOCUMENTS

| | | | | |
|---|---|---|---|---|
| 5,714,952 A | * | 2/1998 | Wada | 341/94 |
| 5,793,949 A | * | 8/1998 | Yusuki et al. | 714/48 |
| 5,818,439 A | * | 10/1998 | Nagasaka et al. | 725/87 |
| 5,898,695 A | * | 4/1999 | Fujii et al. | 370/464 |
| 5,966,120 A | * | 10/1999 | Arazi et al. | 715/724 |
| 6,144,375 A | * | 11/2000 | Jain et al. | 715/251 |
| 6,459,427 B1 | * | 10/2002 | Mao et al. | 725/109 |
| 6,473,902 B1 | * | 10/2002 | Noritomi | 725/91 |
| 6,662,329 B1 | * | 12/2003 | Foster et al. | 714/747 |
| 7,058,963 B2 | * | 6/2006 | Kendall et al. | 725/21 |
| 7,197,088 B1 | * | 3/2007 | Yukawa | 375/316 |
| 7,519,273 B2 | * | 4/2009 | Lowthert et al. | 386/248 |
| 7,761,766 B2 | * | 7/2010 | Boldt et al. | 714/747 |
| 7,937,728 B2 | * | 5/2011 | Barsness et al. | 725/58 |
| 8,042,188 B2 | * | 10/2011 | Takashima et al. | 726/26 |
| 8,079,054 B1 | * | 12/2011 | Dhawan et al. | 725/105 |
| 8,094,728 B2 | * | 1/2012 | Morris | 375/240.26 |

(Continued)

FOREIGN PATENT DOCUMENTS

WO 2008090199 A1 7/2008

OTHER PUBLICATIONS

Wu, et al., "Streaming Video over the Internet: Approaches and Directions", Retrieved at << http://citeseerx.ist.psu.edu/viewdoc/download?doi=10.1.1.70.7880&rep=rep1&type=pdf, Mar. 200, pp. 19.

(Continued)

*Primary Examiner* — An Son Huynh
(74) *Attorney, Agent, or Firm* — Aaron Chatterjee; Judy Kadoura; Micky Minhas

(57) ABSTRACT

Techniques that address content interruptions are described. In an implementation, an interruption is detected at the client device in receipt of a stream of content from a distribution system that is to be recorded locally in memory at the client device. A stream of content is generated at the client device and the generated stream of content is recorded to fill the interruption in the stream of content from the distribution system in the memory of the client device.

20 Claims, 5 Drawing Sheets

(56) References Cited

U.S. PATENT DOCUMENTS

| | | | |
|---|---|---|---|
| 8,107,789 B2* | 1/2012 | Hashimoto et al. | 386/248 |
| 8,917,646 B2* | 12/2014 | Bhogal et al. | 370/312 |
| 2001/0055467 A1* | 12/2001 | Nakatani et al. | 386/46 |
| 2002/0087999 A1* | 7/2002 | Kashima | 725/100 |
| 2004/0114908 A1 | 6/2004 | Ito | |
| 2004/0133909 A1* | 7/2004 | Ma | 725/34 |
| 2004/0139462 A1* | 7/2004 | Hannuksela et al. | 725/32 |
| 2004/0221211 A1* | 11/2004 | Chen | 714/721 |
| 2004/0244058 A1* | 12/2004 | Carlucci et al. | 725/135 |
| 2006/0008250 A1* | 1/2006 | Wang | 386/95 |
| 2006/0153530 A1* | 7/2006 | Cai et al. | 386/85 |
| 2006/0212900 A1* | 9/2006 | Ismail et al. | 725/34 |
| 2007/0266170 A1* | 11/2007 | Mockett | 709/231 |
| 2007/0266400 A1* | 11/2007 | Rogers et al. | 725/42 |
| 2008/0022296 A1* | 1/2008 | Iggulden | 725/22 |
| 2008/0098423 A1* | 4/2008 | Malik | 725/34 |
| 2008/0115171 A1* | 5/2008 | Barsness et al. | 725/58 |
| 2008/0141091 A1* | 6/2008 | Kalluri | 714/748 |
| 2008/0148123 A1* | 6/2008 | Pendakur et al. | 714/748 |
| 2008/0162666 A1 | 7/2008 | Ebihara et al. | |
| 2008/0209469 A1* | 8/2008 | Gottlieb et al. | 725/39 |
| 2008/0226261 A1 | 9/2008 | Himeno et al. | |
| 2008/0301746 A1* | 12/2008 | Wiser et al. | 725/114 |
| 2009/0067301 A1* | 3/2009 | Song et al. | 369/47.14 |
| 2009/0103892 A1* | 4/2009 | Hirayama et al. | 386/83 |
| 2009/0106804 A1* | 4/2009 | Bhogal et al. | 725/110 |
| 2009/0204719 A1* | 8/2009 | Simongini et al. | 709/231 |
| 2009/0300673 A1* | 12/2009 | Bachet et al. | 725/31 |
| 2010/0031162 A1* | 2/2010 | Wiser et al. | 715/747 |
| 2010/0169493 A1* | 7/2010 | Yamakawa et al. | 709/227 |
| 2010/0199159 A1* | 8/2010 | Isnardi et al. | 714/807 |
| 2011/0131620 A1* | 6/2011 | Holley | 725/98 |

OTHER PUBLICATIONS

Girod, et al., "Packet Loss Resilient Internet Video Streaming", Retrieved at<< https://eprints.kfupm.edu.sa/56675/1/56675.pdf>>, Jan. 1999, pp. 12.

"Real Time Monitoring of Video Streams", Retrieved at<< http://www.neseapl.com/solutions_streaming.html>>, Jan. 11, 2009, pp. 3.

* cited by examiner

300 ⟶

302
Detect an interruption at the client device during receipt of a stream of content from a distribution system that is to be recorded locally in memory at the client device

↓

304
Generate a stream of content at the client device

↓

306
Record the generated stream of content to fill the interruption in the stream of content from the distribution system in the memory of the client device

*Fig. 3*

CONTENT INTERRUPTIONS

BACKGROUND

Content may be obtained from a variety of different sources for recording by a client device. For example, the client device may be configured as a digital video recorder to record television content for later viewing, thereby "time shifting" a viewing of the content. When obtaining this content via a network connection, however, there may be instances in which the network connection is unreliable.

This unreliability may have a number of undesirable consequences, such as resulting in degraded and even missing portions of the content that was communicated via the connection. Additionally, this unreliability may even cause traditional techniques that were used to record the content to fail. For example, the traditional techniques may stop recording altogether, thereby resulting in a limited recording of an initial portion of the content, if at all. In another example, the traditional techniques may result in a fractured recording of the content, which resulted in recordation of the content as multiple separate potions that were divided by the interruptions.

SUMMARY

Techniques that address content interruptions are described. In an implementation, an interruption is detected at the client device in receipt of a stream of content from a distribution system that is to be recorded locally in memory at the client device. A stream of content is generated at the client device and the generated stream of content is recorded to fill the interruption in the stream of content from the distribution system in the memory of the client device.

In an implementation, a client device comprises one or more modules implemented at least in part by hardware and configured to identify an error condition that exists with respect to reception of a stream of content from a distribution system at the client device. The one or more modules are also configured to select from content that is stored locally at the client device that corresponds to the identified error condition and stream the selected content in place of the stream of content from the distribution system until the error condition is resolved.

In an implementation, one or more computer-readable media comprise instructions that are stored thereon that, responsive to execution by a client device, cause the client device to perform operations that include responsive to a request to output content that was recorded locally at the client device, determine that an interruption occurred in the streaming of the content to the client device; and output a notification of the existence of the interruption in the recording of the content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is a flow diagram depicting a procedure in an example implementation in which detection of an interruption at a client device in reception of a stream of content causes the client device to generate a stream of content locally to fill the interruption.

DETAILED DESCRIPTION

Overview

Unreliable network connections may cause a variety of different complications to client devices that stream content via the connection. This may become particularly troublesome when the content being communicated over an unreliable network connection is being consumed by a media sink device, such as to record the content using digital video recorder (DVR) functionality. For example, the media sink device may be configured to consume a relatively constant stream of content. In instances in which the stream of content is not relatively constant (e.g., interrupted), the media sink device may stop recordings or live viewing prematurely. This may be especially troublesome in recording as these interruptions may cause the content to be recorded in segments that are divided by each interruption, even if the interruption is relatively temporary.

Content techniques that address interruptions are described. In an implementation, a client device (e.g., a digital video recorder) is configured to detect an interruption in a stream of content delivered via a network connection, such as television programming. In response, the client device may then generate a stream of content of "fill the holes" in the stream of content received via the network connection. The generated content may contain a variety of different information, such as a notification that indicates what caused the interruption, and so on.

In an implementation, the content (both streamed to and generated by the client device to form a single stream of recorded content) is also configured to include a notification. The notification may provide an indication to a user that the recorded content includes the interruption. Thus, a user that wishes to interact with the content may be informed of the interruption before consumption is started. Further discussion of this and other implementations may be found in relation to the following sections.

In the following discussion, an example environment is first described that is operable to perform techniques that address content interruptions. Example procedures are then described that may be employed in the example environment, as well as in other environments. Although these techniques are described as employed within a television environment in the following discussion, it should be readily apparent that these techniques may be incorporated within a variety of environments without departing from the spirit and scope thereof.

Example Environment

Figure 1:
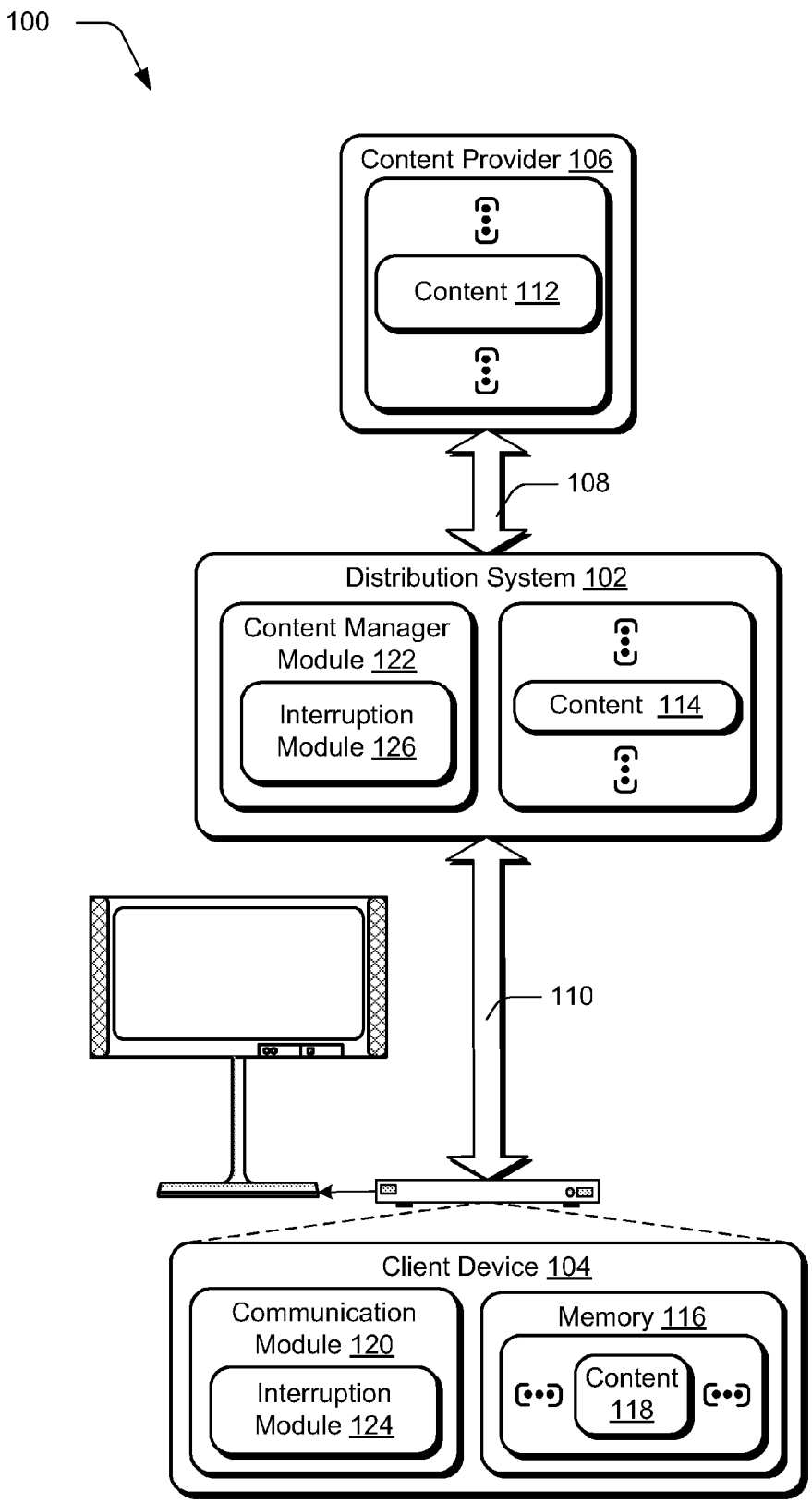
FIG. 1 is an illustration of an environment in an example implementation that is operable to employ techniques that address content interruptions.

FIG. 1 is an illustration of an environment 100 in an example implementation that is operable to address content interruptions. The illustrated environment 100 includes a distribution system 102 of a network operator which may employ one or more distribution servers, a client device 104 and a content provider 106 that are communicatively coupled, one to another, via network connections 108, 110. In the following discussion, the distribution system 102, the client device 104 and the content provider 106 may be representative of one or more entities, and therefore reference may be made to a single entity (e.g., the client device 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client device 104 may be configured in a variety of ways. For example, the client device 104 may be configured as a computer that is capable of communicating over the network connection 110, such as a desktop computer (e.g., a media center computer), a mobile station, an entertainment appliance, a set-top box communicatively coupled to a display device as illustrated, a wireless phone, and so forth.

The content provider 106 includes one or more items of content 112. The content 112 may include a variety of data, such as television programming, video-on-demand (VOD) files, downloadable media, and so on. The content 112 is communicated over the network connection 108 to the distribution system 102.

Content 112 communicated via the network connection 108 is received by the distribution system 102 and may be stored as one or more items of content 114. The content 114 may be the same as or different from the content 112 received from the content provider 106. The content 114, for instance, may include additional data for broadcast to the client device 104, such as electronic program guide data, and so on. Additionally, the content 114 may be encapsulated in a transport stream that is communicated over the network connection 110 to the client device 104.

The client device 104, as previously stated, may be configured in a variety of ways to receive the content 114 streamed over the network connection 110. The client device 104 typically includes hardware and software to transport and decrypt the content 114 received from the distribution system 102 for rendering, e.g., by the illustrated display device and speakers.

The client device 104 in the example environment 100 includes digital video recorder (DVR) functionality. For instance, the client device 104 may include memory 116 to record content 114 as content 118 received via the network connection 110 for output to and rendering by the display device and speakers. The memory 116 may be configured in a variety of ways, such as a hard disk drive, a removable computer-readable medium (e.g., a writable digital video disc), semiconductor based memory, accessible "over the cloud" via one or more servers, and so on. Thus, content 118 that is stored in the memory 116 of the client device 104 may be copies of the content 114 that was streamed from the distribution system 102.

The client device 104 as illustrated in this example also includes a communication module 120 that is executable on the client device 104 to control content playback on the client device 104, such as through the use of one or more "command modes" (i.e., "trick modes") to tune to a particular channel, order pay-per-view content, and so on. The command modes may provide non-linear playback of the content 118 (i.e., time shift the playback of the content 118) such as pause, rewind, fast forward, slow motion playback, and the like.

The distribution system 102 is illustrated as including a content manager module 122. The content manager module 122 is representative of functionality to configure content 114 for streaming over the network connection 110 to the client device 104. The content manager module 126, for instance, may configure content 112 received from the content provider 106 to be suitable for transmission over the network connection 108, such as to "packetize" the content 114 into a plurality of streams that are encapsulated within a transport stream for distribution over the Internet, map the content 114 to particular channels, and so on.

Thus, in the environment 100 of FIG. 1, the content provider 106 may broadcast the content 112 over a network connection 108 to a multiplicity of network operators, an example of which is illustrated as distribution system 102. The distribution system 102 may then stream the content 114 over a network connection 110 to a multitude of client devices, an example of which is illustrated as client device 104. The client device 104 may then store the content 114 in the memory 116 as content 118 and/or render the content 114 immediately for output as it is received, such as when the client device 104 is configured to include digital video recorder (DVR) functionality.

As previously described, in some instances the network connection 110 between the client device 104 and the distribution system 102 may be unreliable and therefore cause one or more interruptions to the stream of content 114. The interruptions may be caused in a variety of different ways, such as fluctuating bandwidth that drops below a threshold amount usable to stream the content 114, dropped altogether, contain varying amounts of "noise," and so on.

Accordingly, the client device 104 is illustrated as included an interruption module 124 that is representative of functionality to address interruptions of content 114 via the network connection 110. For example, the interruption module 124 may be configured to generate a stream of content locally at the device to fill gaps in the streaming of the content over the network connection. In this way the interruption module 124 may help limit media sinks (e.g., DVR functionality) from "dropping out" or resulting in a segmented recording, further discussion of which may be found in relation to the following figure.

It should be noted that one or more of the entities shown in FIG. 1 may be further divided (e.g., the distribution system 102 may be implemented by a plurality of servers in a distributed computing system), combined, and so on and thus the environment 100 of FIG. 1 is illustrative of one of a plurality of different environments that may employ the described techniques. For example, functionality of the interruption module 124 of the client device 104 may be implemented (e.g., in part or in whole) by the distribution system 102 as illustrated by the interruption module 126. A variety of other examples are also contemplated.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices, e.g., the memory 116 of the client device 104. The features of the techniques to address content interruptions are platform-independent, meaning that the techniques may be implemented on a variety of commercial computing platforms having a variety of processors.

Figure 2:
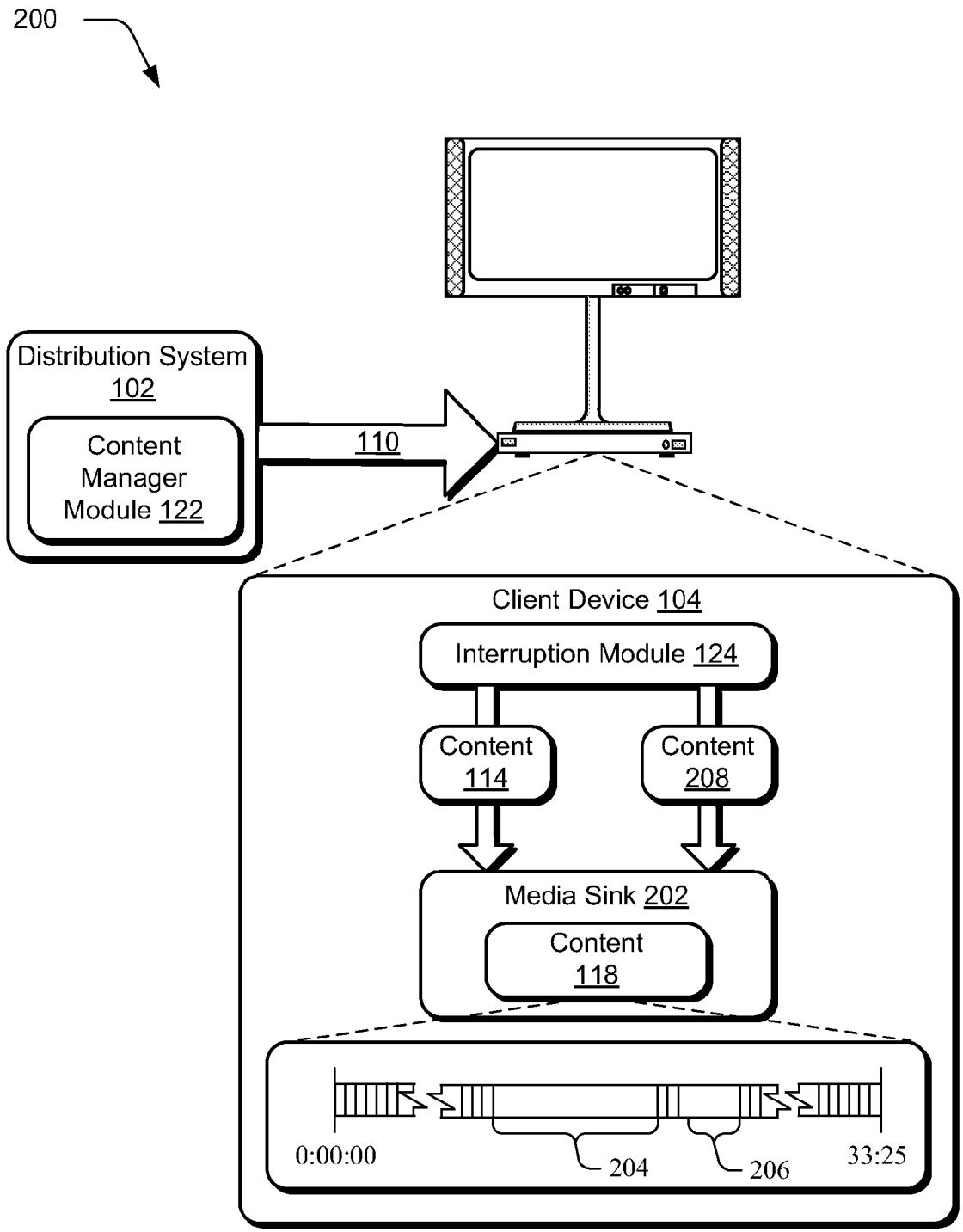
FIG. 2 is an illustration of an example system showing a distribution system and a client device of FIG. 1 in greater detail as addressing an interruption in reception of a stream of content.

FIG. 2 depicts a system 200 in an example implementation showing the client device 104 as implementing the interruption module 124 to address an interruption is a stream of content from the distribution system 102 over the network connection 110. For example, the interruption module 124 may be configured to identify an interruption, such as to identify a signal loss case or specific error. This can be accomplished through a variety of different techniques.

For example, the interruption module 124 may be configured to identify specific error conditions that will make the client device 104 unable to deliver the content 114 to a media sink 202. The media sink 202 is representative of one or more modules that consume content, e.g., to record to memory 116, output as the content is received, and so on. For example, the media sink 202 may not be able to receive content 114 if a connection to the distribution system 102 is unavailable, an upgrade is required, an attempt is made to tune to an invalid or unauthorized channel, or streams are not available for the new request (e.g., constrained by bandwidth). Accordingly, the interruption module 124 may be configured to identify characteristics that are specific to these conditions that may cause an error condition for the media sink 202.

In another example, the interruption module 124 may be configured to employ a general detection metric which utilizes a threshold that represents a loss of content 114. For example the interruption module 124 may be configured to track whether it is delivering the content 114 to the media sink 202 and if it detects a sustained period (e.g., period 204, 206 in the timelines of the content 118) where the content 114 is not delivered (e.g., five seconds), the interruption module 124 may detect this condition as a stream loss error. A variety of other error conditions are also contemplated that may be detected by the interruption module 124.

Once the error case has been identified, the interruption module 124 may begin supplying a stream of content 208 to the media sink 202 (e.g., by creating valid AV data internally) to supplement the loss of content 114 from the network connection 110. One techniques may be used is to employ a pre-cached stream of content (e.g., a video stream) and to properly repair the stream of content 114 so that it is a valid MPEG2TS video stream, e.g., is compliant with MPEG2 transport stream protocols. Thus, in this example costly CPU operations are avoided that would be involved in creation of a valid stream from scratch. However, other implementations are also contemplated, such as to create the content 208 "from scratch" as mentioned above.

Additionally, the interruption module 124 may be configured to determine the minimum characteristics of the stream that are involved to keep the media sink 202 functioning, e.g., to keep a video pipeline of the media sink 202 alive. For example, the interruption module 124 may determine that valid PAT/PMT values in the content 208 generated by the interruption module 124 will keep the media sink 202 active. Therefore in error cases where the network connection 110 is unable to provide content 114, the interruption module 124 may send a pre-generated PAT/PMT values in the content 208 that mimic a valid stream, may generate the PAT/PMT values in real time, and so on.

In another example, the interruption module 124 may determine that the media sink 202 uses a full AV stream to be "kept alive," accordingly the interruption module 124 may use pre-configured video file as the content 208 to fill holes caused by an interruption. For instance, a cached black video file may be "looped" by the interruption module 124 and streamed to the media sink 202. In each of these examples, the interruption module 124 may adjust the timeline of the content 208 to be valid, in which case the interruption module 124 may be configured to generate and replace program clock references (PCRs) in the content 208 based off an internal clock maintained at the client device 104.

The interruption module 124 may also be configured to use the content 208 to fill the interruptions 204, 206 as an opportunity to provide an intuitive, specific, and accurate error message to an end user of the client device 104. This can be accomplished in a variety of ways. For example, the interruption module 124 may be configured to leverage capabilities provided by the media sink 202 to present an error message to the end user. In this example, the interruption module 124 may rely on generation of the content 208 to keep live viewing or recording performed by the media sink 202 "alive," thereby allowing the end user to be presented with the error message from the media sink 202. For instance, the media sink 202 may be configured to provide a descramble failure notification construct to present custom Media Center Markup Language (MCML) error messages during the interruptions 204, 206.

In another example, the content 208 that is generated by the interruption module 124 may contain the actual error message. This ensures that the error message included in the content 208 is presented to the user in pause buffer or recording scenarios, e.g., using the control modes previously described. To accomplish this, instead of streaming black video file as content 208, the interruption module 124 may select from a collection of pre-generated videos to supply content 208, each of which corresponding to a respective error condition. A variety of other examples are also contemplated, further discussion of which may be found in relation to the following procedures.

Example Procedures

The following discussion describes techniques to address content interruptions that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, respectively.

FIG. 3 depicts a procedure 300 in an example implementation in which detection of an interruption at a client device in reception of a stream of content causes the client device to generate a stream of content locally to fill the interruption. An interruption is detected at a client device during receipt of a stream of content from a distribution system that is to be recorded locally in memory at the client device (block 302). For example, the interruption module 124 may determine that content 114 that is to be received from the distribution system 102 over the network connection 110 has ceased streaming for at least a threshold amount of time, quality of the network connection 110 has dropped below a predetermined threshold, network bandwidth has been reduced below a predetermined threshold, and so on.

A stream of content is generated at the client device (block 304). For example, the content 208 may be preconfigured, stored at the client device 104, and then streamed to "fill holes" in the content 114 caused by the interruption. In another example, the interruption module 124 may generate the content 208 "from scratch," such as to include references to error conditions that are likely to have caused the interruption.

The generated stream of content is recorded to fill the interruption in the stream of content from the distribution system in the memory of the client device (block 306). For example, the content 114 from the distribution system 102 and the content 208 generated by the interruption module 124 may be used to form an uninterrupted stream of content 118 that can be saved to memory 116 and/or output as received by the media sink 202. The content 118, for instance, may include PAT/PMT values that cause the media sink 202 to "see" the content 208 used to fill interruptions in content 114 as a new stream so as not to cause the media sink 202 to "throw an error." In another instance, the content 208 may include PCR values generated by the interruption module 124 (e.g., via an internal clock of the client device 104) to form the uninterrupted stream of content 118. A variety of other protocols may be addressed by the interruption module 124 to form the stream of content 118 without departing from the spirit and scope thereof.

Figure 4:
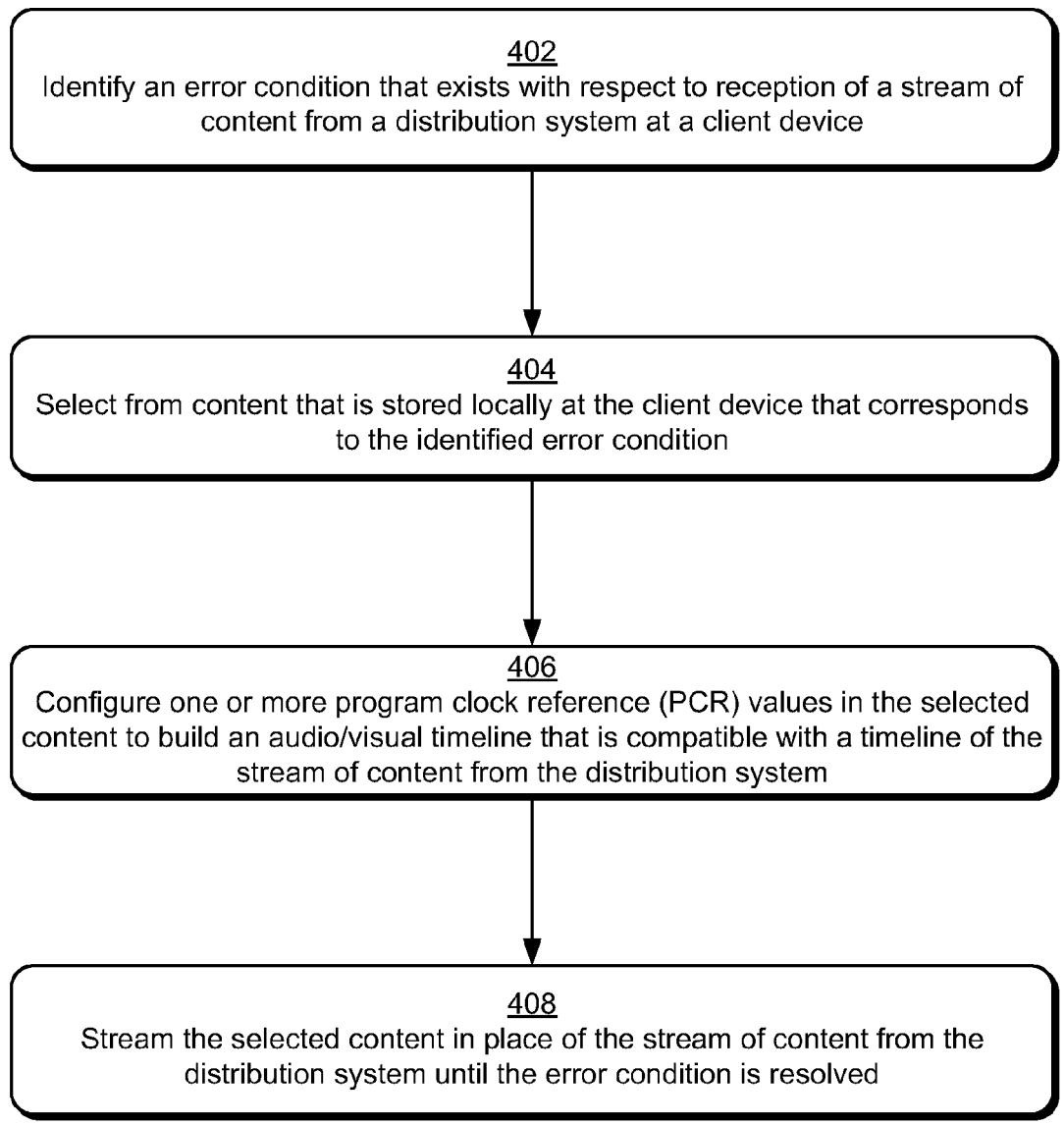
FIG. 4 is a flow diagram depicting a procedure in an example implementation in which an error condition is identified and used to select content that is to be generated to fill one or more interruptions in a stream of content that is to be received from a distribution system.

FIG. 4 depicts a procedure 400 in an example implementation in which an error condition is identified and used to select content that is to be generated to fill one or more interruptions in a stream of content that is to be received from a distribution system. An error condition is identified that exists with respect to reception of a stream of content from a distribution system at a client device (block 402). For example, the interruption module 124 may employ a general detection metric that utilizes one or more thresholds to detect the interruption, determine that the client device 104 has "tuned" to an invalid or unavailable channel, and so on as previously described.

A selection is made from content that is stored locally at the client device that corresponds to the identified error condition (block 404). For example, the interruption module 124 may select from a plurality of preconfigured content an item of content that describes the error condition that was detected.

One or more program clock reference (PCR) values are configured in the selected content to build an audio/visual timeline that is compatible with a timeline of the stream of content from the distribution system (block 406). Continuing with the previous example, the interruption module 124 may configure the selected item of content to include PCR values that follow the PCR values of the content 114 to provide an uninterrupted stream of content 118.

The selected content is then streamed in place of the stream of content from the distribution system until the error condition is resolved (block 408). The interruption module 124, for instance, may detect that the content 114 has continued streaming via the network connection 114 and accordingly stop streaming of the content 208 generated by the module. In another instance, the interruption module 124 may determine that an amount of time that was to be used to stream the content 114 has ended (e.g., determine that an end of a television program was to be reached at approximately this moment such as from electronic program guide data or other metadata) and cease streaming of the generated content 208. A variety of other examples are also contemplated.

Figure 5:
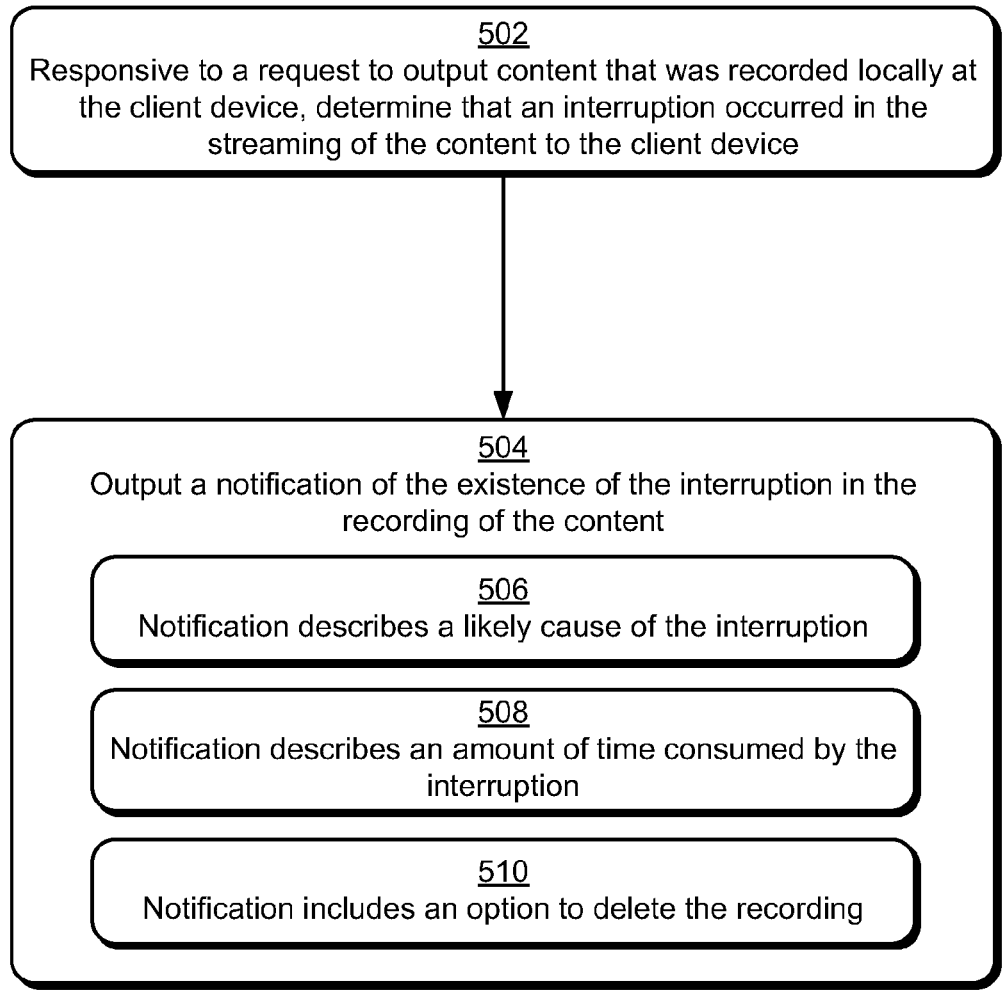
FIG. 5 is a flow diagram depicting a procedure in an example implementation in which a notification is output to indicate that content recorded by a client device includes one or more interruptions.

FIG. 5 depicts a procedure 500 in an example implementation in which a notification is output to indicate that content recorded by a client device includes one or more interruptions. Responsive to a request to output content that was recorded locally at the client device, a determination is made that an interruption occurred in the streaming of the content to the client device (block 502). For example, the interruption module 124 may be used to "fill holes" in the content 114 caused by interruptions with content 208 generated at the client device 104. The interruption module 124 may also be configured to insert a flag or other indication that references the existence of the interruption.

Therefore, if a request is received from a user to render the content 118, a notification is output of the existence of the interruption in the recording of the content (block 504), such as upon detection of the flag or notification included in the content 118 itself. The notification may be configured in a variety of ways to provide a variety of information. For example, the notification may describe a likely cause of the interruption (block 506), such as the cause detected by the interruption module 124 at block 302 of FIG. 3. The notification may also describe an amount of time consumed by the interruption (block 508), e.g., a length of the interruption.

The notification may further include an option to delete the recording (block 510). Continuing with the previous example, a user may view the notification and learn that a relatively large portion of the content 114 is missing. Accordingly, the notification may include the option to delete the recording without involving navigation through one or more other options to do so, e.g., non-modal. A variety of other information may also be included in the notification without departing from the spirit and scope thereof, such as a proposed fix for interruption, describe another location that is usable to obtain the content (e.g., a website), include an option to record a future "airing" of the content, and so on.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more modules of a client device, the method comprising:
   receiving a stream of content from a distribution system that is to be recorded locally in memory at the client device using a media sink;
   detecting an interruption of receipt of the stream of content from the distribution system that results in a loss of at least some of the content of the stream;
   determining minimum content stream characteristics based on a predetermined threshold that enable the media sink to continue recording the stream of content to the memory of the client device;
   generating a stream of supplemental content at the client device that has at least the determined minimum characteristics to supplement the loss of the at least some content, including generating program clock reference (PCR) values for the stream of supplemental content and configuring the generated PCR values according to an internal clock maintained at the client device to follow PCR values of the stream of content;
   combining the supplemental content with portions of the stream of content that are received from the distribution system to form an uninterrupted stream of content, the supplemental content filling a gap in the stream of content caused by the interruption; and using the media sink to record the uninterrupted stream of content in the memory of the client device.

2. The method as described in claim 1, wherein the combining includes recording the stream of supplemental content in conjunction with recording the portions of the stream of content that are received from the distribution system to form the uninterrupted stream of content in the memory of the client device.

3. The method as described in claim 2, wherein the uninterrupted stream of content is configured in accordance with one or more MPEG2transport stream protocols.

4. The method as described in claim 1, wherein the generating utilizes content that is pre-cached in the memory of the client device.

5. The method as described in claim 1, wherein the generating includes generating PAT/PMT values for the stream of supplemental content at the client device.

6. The method as described in claim 1, further comprising causing a notification to be output that indicates the interruption occurred, and the causing being performed responsive to a flag that was inserted while recording the stream of content to indicate that recordation of the content streamed from the distribution system includes the interruption.

7. The method as described in claim 6, wherein the flag causes the notification to be output at an approximate beginning of an output of the uninterrupted stream of content.

8. The method as described in claim 7, wherein the notification includes an option to delete the recordation.

9. The method as described in claim 7, wherein the notification describes an amount of time the interruption occurred or where in the recordation of the content from the distribution system the interruption is located.

10. The method as described in claim 1, wherein the stream of supplemental content includes an error message.

11. The method as described in claim 10, wherein the error message describes a likely cause of the interruption.

12. The method as described in claim 1, further comprising configuring the generated PCR values in the supplemental content to build an audio/visual timeline that is compatible with a timeline of the stream of content from the distribution system.

13. A client device comprising one or more modules implemented at least in part by hardware to:

identify an error condition that exists with respect to reception of a stream of content from a distribution system at the client device, the error condition causing the reception of the stream of content to be interrupted, the interrupted reception causing a loss of at least some content of the stream of content at the client device;

select from content that is stored locally at the client device that corresponds to the identified error condition to generate a stream of supplemental content, the stream of supplemental content generated to fill a gap in the stream of content that results from the at least some content that is lost;

generate Program Clock Reference (PCR) values for the stream of supplemental content, the PCR values generated using an internal clock maintained at the client device and to build an audio/visual timeline for the stream of supplemental content that is compatible with a timeline of the stream of content from the distribution system;

stream the supplemental content to a media sink of the client device for consumption, the supplemental content streamed in place of the stream of content from the distribution system until the error condition is resolved, the supplemental content combined with portions of the stream of content received before and after the reception is interrupted to stream an uninterrupted stream of content to the media sink by filling the gap in the stream of content, the media sink consuming content streams that have at least a level of continuity that meets a predetermined threshold and to stop consuming content streams that do not have the level of continuity, the uninterrupted stream of content enabling the media sink to continue consuming the stream of content; and responsive to receipt of a request for the media sink to output the uninterrupted stream of content from the client device, causing the media sink to output a notification for viewing by a user that indicates the error condition occurred.

14. The client device as described in claim 13, wherein the error condition interrupts the reception of the stream of content from the distribution system at the client device.

15. The client device as described in claim 13, wherein the one or more modules configure the generated PCR values in the supplemental content to build the audio/visual timeline.

16. A client device comprising one or more modules implemented at least in part by hardware and configured to perform operations comprising:

responsive to a request to output a recording of content that was recorded locally at the client device using a media sink, determining that an interruption occurred in streaming of at least one portion of the content from a distribution system to the media sink of the client device, the interruption resulting in a loss of content from the at least one portion, the recording of the content including the at least one portion of the content and at least one other portion comprising a stream of supplemental content that is generated at the client device to fill a gap caused by the interruption that occurred in the streaming by replacing the content that was lost, the at least one other portion having minimum content stream characteristics that are determined based on a predetermined threshold that enables the media sink to output the recording, and generation of the supplemental content including generating program clock reference (PCR) values for the stream of supplemental content and configuring the generated PCR values according to an internal clock maintained at the client device to follow PCR values of the at least one portion; and outputting a notification via the media sink, for viewing by a user, of the existence of the interruption in the recording of the content.

17. The client device as described in claim 16, wherein the determining is performed by detecting a flag in the content.

18. The client device as described in claim 16, wherein the streaming is performed from a distribution system that is remote to the client device and assessable via a network.

19. The client device as described in claim 16, wherein the outputting of the notification is performed before outputting the content.

20. The client device as described in claim 16, wherein the notification describes a likely cause of the interruption and an amount of time consumed by the interruption.

* * * * *